US011487940B1

(12) United States Patent
Ishikawa et al.

(10) Patent No.: US 11,487,940 B1
(45) Date of Patent: Nov. 1, 2022

(54) CONTROLLING ABSTRACTION OF RULE GENERATION BASED ON LINGUISTIC CONTEXT

(71) Applicant: International Business Machines Corporation, Armonk, NY (US)

(72) Inventors: Shunsuke Ishikawa, Tokyo (JP); Ken Kumagai, Tokyo (JP); Akihiro Nakayama, Kanagawa (JP); Susumu Fukuda, Saitama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/304,453

(22) Filed: Jun. 21, 2021

(51) Int. Cl.
*G06F 17/10* (2006.01)
*G06F 40/284* (2020.01)
*G06F 3/0482* (2013.01)
*G06V 30/416* (2022.01)

(52) U.S. Cl.
CPC .......... *G06F 40/284* (2020.01); *G06F 3/0482* (2013.01); *G06V 30/416* (2022.01)

(58) Field of Classification Search
CPC .... G06F 40/284; G06F 3/0482; G06V 30/416
See application file for complete search history.

(56) References Cited

U.S. PATENT DOCUMENTS

| 6,330,007 B1 * | 12/2001 | Isreal | G06F 8/38 |
| | | | 715/764 |
| 7,930,678 B2 * | 4/2011 | Tian | G06Q 10/08 |
| | | | 717/113 |

(Continued)

FOREIGN PATENT DOCUMENTS

| CN | 114520107 A | * | 5/2022 | ............ H01F 27/24 |
| JP | H06208580 A | * | 7/1994 | |

(Continued)

OTHER PUBLICATIONS

Brauer, Falk, et al. "Enabling information extraction by inference of regular expressions from sample entities." Proceedings of the 20th ACM international conference on Information and knowledge management. (Year: 2011).*

Anonymous, "Method for matching terms in rule-based text analysis," An IP.com Prior Art Database Technical Disclosure, IPCOM000235832D, Mar. 26, 2014, 6 pages. https://priorart.ip.com/IPCOM/000235832.

(Continued)

*Primary Examiner* — Shahid K Khan
(74) *Attorney, Agent, or Firm* — Yee & Associates, P.C.

(57) ABSTRACT

Generating rules to automatically extract linguistic patterns from documents is provided. A first plurality of linguistic pattern extraction rules corresponding to a user-selected text example from a document is generated according to a first abstraction rule of a plurality of abstraction rules. Each respective linguistic pattern extraction rule of the first plurality of linguistic pattern extraction rules having a first identified level of abstraction. The first plurality of linguistic pattern extraction rules ordered by the first identified level of abstraction is presented in a first list to a user via a user interface. A selection of one particular linguistic pattern extraction rule is received from the first list by the user via the user interface. That one particular linguistic pattern extraction rule selected by the user is applied to the document to automatically extract user-desired linguistic patterns similar to the user-selected text example from the document.

20 Claims, 6 Drawing Sheets

(56) References Cited

U.S. PATENT DOCUMENTS

| | | | | |
|---|---|---|---|---|
| 8,060,357 | B2* | 11/2011 | Segond | G06F 16/31 704/7 |
| 8,326,809 | B2* | 12/2012 | Vetere | G06F 16/313 707/693 |
| 8,370,128 | B2* | 2/2013 | Brun | G06F 40/30 704/10 |
| 8,374,844 | B2* | 2/2013 | Brun | G06F 40/295 704/4 |
| 8,676,568 | B2* | 3/2014 | Minegishi | G06F 11/3072 704/4 |
| 8,805,877 | B2 | 8/2014 | Krishmamurthy et al. | |
| 8,990,070 | B2* | 3/2015 | Dayan | G06F 8/37 704/252 |
| 9,002,772 | B2* | 4/2015 | Cohen | G06F 40/205 707/755 |
| 9,164,980 | B2* | 10/2015 | Shimizu | G06F 40/295 |
| 10,354,303 | B1* | 7/2019 | Ran | G06Q 30/0609 |
| 10,762,301 | B1* | 9/2020 | Johnson | G06F 40/40 |
| 11,281,865 | B1* | 3/2022 | Johnson | G06F 3/04847 |
| 2001/0037405 | A1* | 11/2001 | Sideek | H04L 67/04 707/E17.121 |
| 2003/0177192 | A1* | 9/2003 | Umeki | H04L 51/216 709/206 |
| 2005/0160086 | A1* | 7/2005 | Haraguchi | G06Q 10/00 |
| 2006/0136196 | A1* | 6/2006 | Brun | G06F 40/295 704/8 |
| 2007/0179776 | A1* | 8/2007 | Segond | G06F 40/211 707/E17.062 |
| 2007/0219773 | A1* | 9/2007 | Roux | G06F 40/237 704/1 |
| 2010/0125450 | A1* | 5/2010 | Michaelangelo | G06F 40/232 704/235 |
| 2013/0138425 | A1* | 5/2013 | Luke | G06F 40/284 704/9 |
| 2013/0144605 | A1* | 6/2013 | Brager | G06F 16/30 704/9 |
| 2013/0268260 | A1* | 10/2013 | Lundberg | G06F 11/3664 704/8 |
| 2014/0236573 | A1* | 8/2014 | Allen | G06F 40/30 704/9 |
| 2014/0309984 | A1 | 10/2014 | Bostick et al. | |
| 2014/0324469 | A1* | 10/2014 | Reiner | G16H 50/70 705/3 |
| 2015/0324857 | A1* | 11/2015 | Siegel | G06Q 30/0269 705/14.64 |
| 2017/0371858 | A1* | 12/2017 | Hosokawa | G06F 3/0482 |
| 2018/0165279 | A1* | 6/2018 | Issaev | G06F 40/268 |
| 2018/0232648 | A1* | 8/2018 | Acharya | G06N 3/0472 |
| 2020/0149908 | A1* | 5/2020 | Furuichi | G01C 21/3484 |
| 2020/0167313 | A1* | 5/2020 | Isoda | G06F 21/6254 |
| 2020/0175229 | A1* | 6/2020 | Iwakura | G06N 7/005 |
| 2021/0117807 | A1* | 4/2021 | Zhou | G06K 9/6215 |

FOREIGN PATENT DOCUMENTS

| | | | | |
|---|---|---|---|---|
| JP | 2004213551 | A | * | 7/2004 |
| JP | 2006018448 | A | * | 1/2006 |
| JP | 2007066007 | A | * | 3/2007 |
| JP | 2010134766 | A | * | 6/2010 |
| WO | WO-2012057170 | A1 | * | 5/2012 ......... G06F 11/3604 |

OTHER PUBLICATIONS

"Regexp Assemble for PHP," Accessed Mar. 9, 2021, English Language Translation Included, 3 pages. http://rtilabs.rti-giken.jp/files/2011_11_02/v.

Aarya, "Rule-Based Phrase Text Extraction and Matching Using SpaCy," KGP Talkie, Sep. 9, 2020, Accessed Mar. 2, 2021, 20 pages. https://kgptalkie.com/rule-based-phrase-text-extraction-and-matching-using-spacy/.

"Token-based matching," spaCy: TokenMatcher, Accessed Mar. 9, 2021, Copyright 2016-2021 Explosion, 57 pages. https://spacy.io/usage/rule-based-matching#matcher.

"Software (/software/) > Stanford TokensRegex," The Standford Natural Language Processing Group, Accessed Mar. 9, 2021, 10 pages. https://nlp.stanford.edu/software/tokensregex.html.

Lee, "Writing Linguistic Rules for Natural Language Processing," Towards Data Science, A Medium publication sharing concepts, ideas and codes, Accessed Mar. 2, 2021, 18 pages. https://towardsdatascience.com/linguistic-rule-writing-for-nlp-ml-64d9af824ee8.

Walker, "Generating Structured Data from Unstructured Data," Dec. 19, 2020, Towards Data Science, A Medium publication sharing concepts, ideas and codes, Accessed Jun. 1, 2021, 7 pages. https://towardsdatascience.com/generating-structured-data-from-unstructured-data-366839c63c89.

* cited by examiner

FIG. 3D

CONTROLLING ABSTRACTION OF RULE GENERATION BASED ON LINGUISTIC CONTEXT

BACKGROUND

1. Field

The disclosure relates generally to natural language processing and more specifically to generating linguistic pattern extraction rules corresponding to a user-selected text example from a document of a particular data domain according to at least one of a plurality of abstraction rules to automatically extract linguistic patterns from a set of user-selected documents of the particular data domain based on linguistic context of the user-selected text example using natural language processing.

2. Description of the Related Art

Natural language processing is an ability of a computer to understand human language and is a component of artificial intelligence. Natural language processing may, for example, parse text into identifiable parts, such as words, phrases, numbers, and punctuation marks. Natural language processing may perform various methods and techniques for analyzing text, such as, for example, morphological analysis, syntactic analysis, semantic analysis, lexical analysis, and the like. Further, natural language processing may be configured to recognize and analyze any number of different languages.

Furthermore, natural language processing may assign a part of speech to each word. Natural language processing may determine the part of speech to which a word corresponds based on a definition of the word and a context of the word. The context of a word may be based on its relationship with adjacent and related words in a phrase, sentence, or paragraph. The context of a word also may be dependent on one or more previously analyzed passages of text. Examples of parts of speech that may be assigned to words include, but are not limited to, nouns, verbs, adjectives, adverbs, articles, conjunctions, prepositions, and the like.

SUMMARY

According to one illustrative embodiment, a computer-implemented method for generating rules to automatically extract linguistic patterns from documents is provided. A computer generates a first plurality of linguistic pattern extraction rules corresponding to a user-selected text example from a document according to a first abstraction rule of a plurality of abstraction rules. Each respective linguistic pattern extraction rule of the first plurality of linguistic pattern extraction rules having a first identified level of abstraction. The computer presents the first plurality of linguistic pattern extraction rules ordered by the first identified level of abstraction in a first list to a user via a user interface. The computer receives a selection of one particular linguistic pattern extraction rule from the first list by the user via the user interface. The computer applies that one particular linguistic pattern extraction rule selected by the user to the document to automatically extract user-desired linguistic patterns similar to the user-selected text example from the document. According to other illustrative embodiments, a computer system and computer program product for generating rules to automatically extract linguistic patterns from documents are provided.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
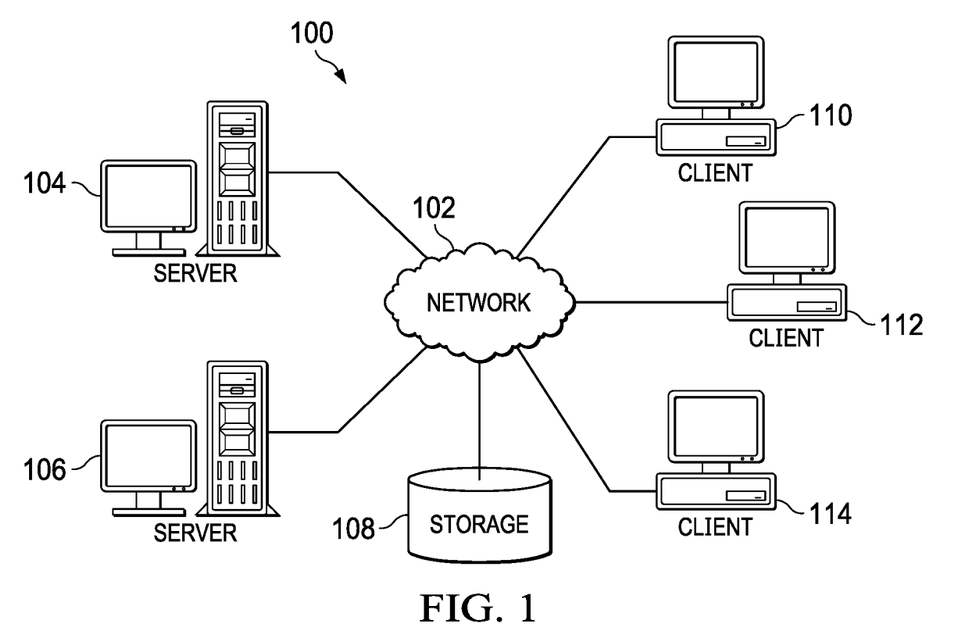
FIG. 1 is a pictorial representation of a network of data processing systems in which illustrative embodiments may be implemented.
Figure 2:
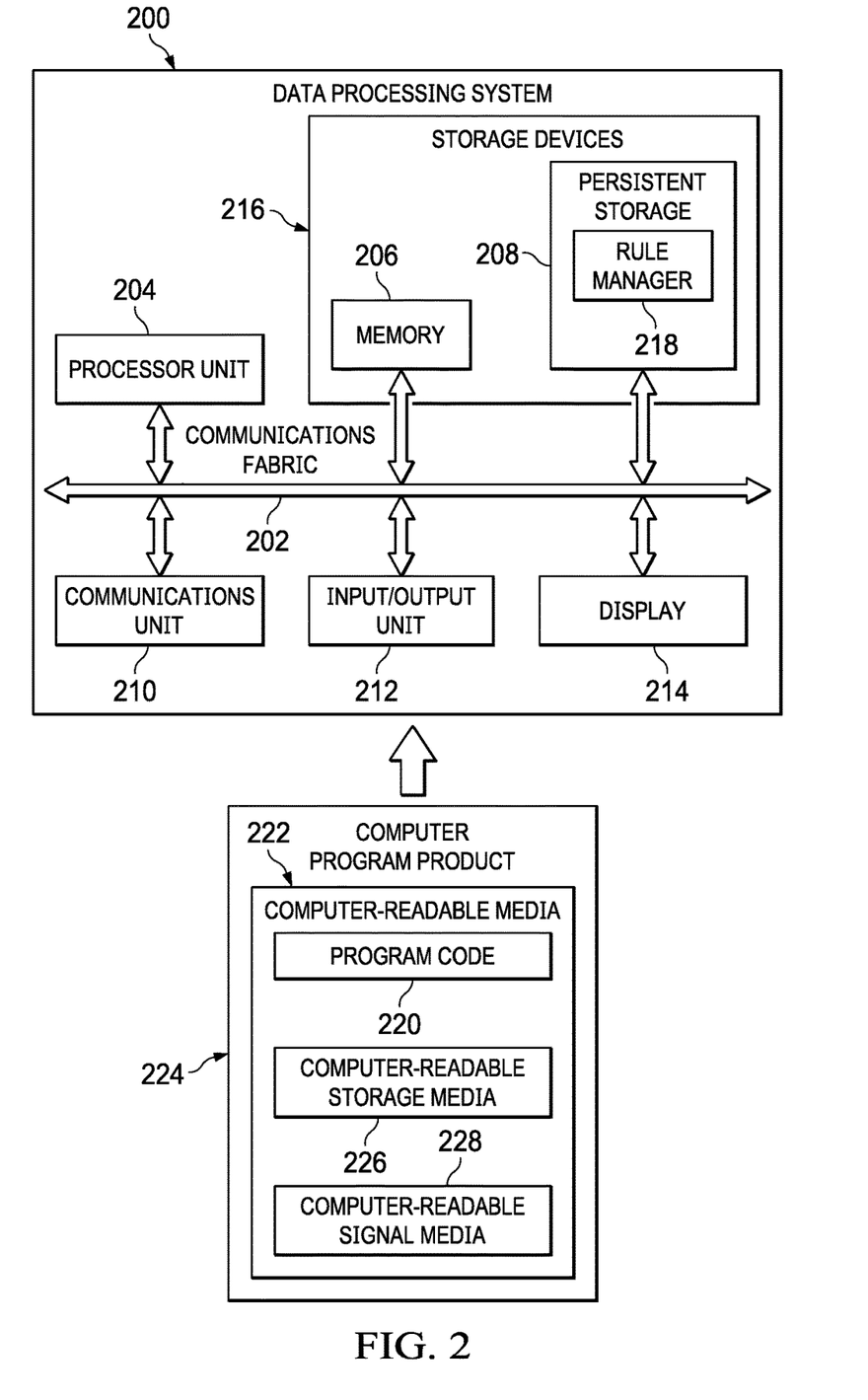
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide linguistic pattern extraction rule generation services to client device users. For example, server 104 and server 106 generate linguistic pattern extraction rules corresponding to user-selected text examples from documents associated with one or more data domains according to a plurality of abstraction rules to automatically extract linguistic patterns from the documents based on linguistic context of the user-selected text examples determined by natural language processing. A linguistic pattern is an arrangement of identifiable or corresponding elements (e.g., words, terms, phrases, or the like) in text, including repetition and similarity, associated with a particular user-selected text example. The data domain may be any data domain corresponding to an entity, such as, for example, an enterprise, company, business, organization, institution, agency, or the like.

Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, smart vehicles, and the like, with wire or wireless communication links to network 102. Users of clients 110, 112, and 114 may utilize clients 110, 112, and 114 to access and utilize the linguistic pattern extraction rule generation services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers and network addresses for a plurality of client devices, identifiers for a plurality of users, a plurality of documents corresponding to a set of data domains, and the like. Furthermore, storage 108 may store other types of data, such as authentication or credential data that may include usernames, passwords, and the like associated with client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the linguistic pattern extraction rule generation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores rule manager 218. However, it should be noted that even though rule manager 218 is illustrated as residing in persistent storage 208, in an alternative illustrative embodiment, rule manager 218 may be a separate component of data processing system 200. For example, rule manager 218 may be a hardware component coupled to communication fabric 202 or a combination of hardware and software components. In another alternative illustrative embodiment, a first set of components of rule manager 218 may be located in data processing system 200 and a second set of components of rule manager 218 may be located in a second data processing system, such as, for example, server 106 in FIG. 1. In yet another alternative illustrative embodiment, rule manager 218 may be located in a client device, such as, for example, client 110 in FIG. 1, in addition to, or instead of, data processing system 200.

Rule manager 218 controls the process of generating a plurality of linguistic pattern extraction rules corresponding to an example of text selected by a user from a document according to an abstraction rule of a plurality of abstraction rules to automatically extract linguistic patterns same as, or similar to, the text example from a set of user-selected documents based on linguistic context of the text example using natural language processing. Rule manager 218 may also utilize a machine learning module to recognize historical usage of linguistic pattern extraction rules by particular users to extract linguistic patterns from documents over time to automatically generate linguistic pattern extraction rules specific to particular users to extract specific linguistic patterns from documents of corresponding data domains.

A machine learning module can learn without being explicitly programmed to do so. The machine learning module can learn based on training data input into the machine learning module. The machine learning module can learn using various types of machine learning algorithms. The various types of machine learning algorithms include at least one of supervised learning, semi-supervised learning, unsupervised learning, feature learning, sparse dictionary learning, association rules, or other types of learning algorithms. Examples of machine learning models include an artificial neural network, a decision tree, a support vector machine, a Bayesian network, a genetic algorithm, and other types of models. These machine learning models can be trained using historical linguistic pattern extraction rule usage data, for example.

As a result, data processing system 200 operates as a special purpose computer system in which rule manager 218 in data processing system 200 enables generation of linguistic pattern extraction rules according to abstraction rules. In particular, rule manager 218 transforms data processing system 200 into a special purpose computer system as compared to currently available general computer systems that do not have rule manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

In natural language processing, it is necessary to generate rules for recognizing patterns of tokens representing certain types of information in a document. For example, to extract certain patterns representing road conditions (e.g., uneven road, icy road, rough road, wet road, dry road, and the like)

in a use case of document analysis corresponding to automobiles, it is preferable to generate a rule to extract patterns such as [adjective]+road from user-selected documents. However, even though the user may select a desirable example pattern to extract from text of the documents, it does not necessarily mean that the user wants to extract only that particular example pattern from the documents, but may mean that the user wants to extract similar patterns as well from the documents.

When illustrative embodiments generate a linguistic pattern extraction rule, the linguistic pattern extraction rule defines that the user-selected text example from the document is to be partially abstracted according to an abstraction rule to extract similar patterns from other documents. For example, illustrative embodiments can abstract the user-selected text example of "a local hospital" to the linguistic pattern extraction rule of "[article] [adjective] hospital". A similar pattern to the user-selected text example of "a local hospital", which matches the linguistic pattern extraction rule "[article] [adjective] hospital" may be the linguistic pattern "the remote hospital" in another document.

However, when generating a linguistic pattern extraction rule, it is difficult to determine which part of, in what order, and how much the selected example text should be abstracted. For example, the linguistic pattern extraction rule for the user-selected text example of "a local hospital" may be "a [adjective] [noun]". In this example, a similar pattern to the user-selected text example of "a local hospital", which matches the linguistic pattern extraction rule "a [adjective] [noun]", may be "a happy day", which the user would consider as a poor or inappropriate match because it is not similar to the user-selected text example. In other words, the linguistic pattern extraction rule "a [adjective] [noun]" is too abstract and does not meet the user's need for extracting linguistic patterns corresponding to "hospital" from documents. In other words, a too abstract linguistic pattern extraction rule provides too many inappropriate and unnecessary linguistic pattern matches for the user's analysis.

As a result, it is desirable to avoid generating a linguistic pattern extraction rule that results in providing a large number of inappropriate linguistic patterns to the user. Illustrative embodiments abstract the user-selected text example stepwise in a defined order based on linguistic context of the user-selected text example from the document. Linguistic context determines a linguistic pattern's interpretation or use within a document. Linguistic context is defined in terms of what precedes and what follows a linguistic pattern. Thus, illustrative embodiments generate linguistic pattern extraction rules that automatically extract relevant linguistic patterns, which match the user's analysis needs and requirements, from a selection of documents by the user.

The user imports a document into a computer that performs processes of illustrative embodiments. The document may be any type of textual document corresponding to any data domain. The data domain may be, for example, a manufacturing domain, a business domain, a banking domain, a financial domain, a healthcare domain, an insurance domain, an education domain, a government domain, an entertainment domain, a research domain, or the like. The computer performs language analysis (e.g., natural language processing, morphological analysis, syntactic analysis, and the like) on the imported document. In linguistics, morphology is the study of words, how the words are formed, and their relationship to other words. Morphological analysis refers to the analysis of a word based on the meaningful parts contained within. Syntactic analysis provides the logical meaning of sentences or certain parts of those sentences. Rules of grammar define the logical meaning, as well as correctness, of the sentences.

In addition, the user selects a text example from the analyzed document. The computer performs the language analysis of the user-selected text example as well and generates a first plurality of linguistic pattern extraction rules based on a first abstraction rule of a plurality of different abstraction rules. The computer orders the plurality of linguistic pattern extraction rules in a list according to a level of abstraction corresponding to each respective linguistic pattern extraction rule from least abstracted to most abstracted.

Afterward, the user selects a linguistic pattern extraction rule from the list. In response to the computer determining that the linguistic pattern extraction rule selected by the user from the list automatically extracts a defined number of user-desired linguistic patterns from the analyzed document, the process terminates. In other words, the linguistic pattern extraction rule selected by the user automatically extracts user-desired linguistic patterns from documents according to the user's needs for document analysis. In response to the computer determining that the linguistic pattern extraction rule selected by the user from the list does not extract the defined number of user-desired linguistic patterns from the analyzed document, the computer generates a second plurality of linguistic pattern extraction rules based on a second abstraction rule of the plurality of different abstraction rules.

The plurality of different abstraction rules includes a first abstraction rule, a second abstraction rule, and a third abstraction rule. The first abstraction rule replaces a token of the user-selected text example with an abstraction. A token is a word, lemma, part of speech, stem, prefix, suffix, or the like. A lemma is a form of a word that appears as an entry in a dictionary and is used to represent all the other possible forms. For example, the lemma "build" represents "builds', "building", "built", and the like. The computer generates an abstraction of a set of tokens that the computer distinguished from each other in the language processing of the user-selected text example. For example, the computer generates the abstraction "noun" for the token "road", the abstraction "adjective" for the token "rough", and the like.

The computer abstracts tokens with a token abstraction score in the order shown below and candidate linguistic pattern extraction rules correspond to all combinations of tokens corresponding to a user-selected text example from a document. For example, the computer first abstracts the "surface" or the user-selected text example (i.e., token), itself, with a token abstraction score of 1; next the computer abstracts a token contained in a user dictionary or having an annotation with a token abstraction score of 2; next the computer abstracts a token that is an article ("ART") with a token abstraction score of 3; next the computer abstracts a token that is an adjective ("ADJ") with a token abstraction score of 4; next the computer abstracts a token that is a noun ("NOUN") with a token abstraction score of 5; next the computer abstracts a token that is a conjunction ("CONJ") with a token abstraction score of 6; next the computer abstracts a token that is an adverb ("ADV") with a token abstraction score of 7; next the computer abstracts a token that is a preposition ("PREP") with a token abstraction score of 8; and the computer finally abstracts a token that is a verb ("VERB") with a token abstraction score of 9.

Surface means characters of a token. For example, the surface "road" matches the characters of the token "road" only. The rule score of surface is equal to 1. A user dictionary contains a list of tokens corresponding to basic, elementary, or simple linguistic patterns. The rule score of dictionary is equal to 2. Using the example above, the user may create a user dictionary of road condition adjectives that contains tokens, such as, for example, "uneven", "icy", "wet", "dry", "rough", "smooth", "slippery", and the like. The computer determines whether tokens in the user-selected text example from the analyzed document are present in the user dictionary. In other words, the user dictionary automatically identifies specific tokens in a document as members of a particular linguistic pattern. It should be noted that the computer may utilize a plurality of different user dictionaries for understanding a plurality of different data domains, such as, for example, manufacturing domains, business domains, banking domains, financial domains, healthcare domains, insurance domains, education domains, government domains, entertainment domains, research domains, engineering domains, scientific domains, and the like.

Further, the computer generates a rule abstraction score for a respective linguistic pattern extraction rule corresponding to a particular set of tokens from a sum of token abstraction scores of respective tokens that correspond to the user-selected text example. As an illustrative example of the first abstraction rule, the computer finds a set of tokens corresponding to the user-selected text example "smooth road" in a "ROAD" user dictionary that contain tokens, such as, for example, road, pavement, and the like. Using the token abstraction scores above, the computer, for example, generates a rule abstraction score for the linguistic pattern extraction rule [ADJ]+road (surface) equal to 5 (i.e., 4+1=5 points for the rule abstraction score); generates a rule abstraction score for the linguistic pattern extraction rule [ADJ]+ROAD (dictionary) equal to 6 (i.e., 4+2=6 points for the rule abstraction score); generates a rule abstraction score for the linguistic pattern extraction rule [ADJ]+[NOUN] equal to 9 (i.e., 4+5=9 points for the rule abstraction score); and the like.

The second abstraction rule is a quantifier of abstraction based on the linguistic pattern extraction rules resulting from the first abstraction rule. For example, the second abstraction rule repeats a particular abstraction, such as the abstraction [ADJ] (i.e., adjective), a defined number of times. In other words, the computer generates a repetitive abstraction for a particular type of token according to the second abstraction rule. For the particular type of token having "N" number of repetitions, where no repetition corresponds to N=1, the computer may, for example, generate a token score of 1 for a particular token with a repetition of N; generate a token score of 2 for a particular token with a repetition of 1-N; generate a token score of 3 for a particular token with a repetition of 0-N; and generate a token score of 4 for a particular token with a repetition of "X"; and the like.

If a plurality of token repetitions exists, then the computer generates a rule abstraction score for a respective linguistic pattern extraction rule based on a sum of token abstraction scores corresponding to a particular type of repeated token. As an illustrative example of the second abstraction rule, the computer finds a set of tokens corresponding to the user-selected example text "wet, even road" in a "ROAD" user dictionary that contain tokens, such as, for example, road, pavement, and the like. The computer then, for example, generates a linguistic pattern extraction rule of "[ADJ] [ADJ] ROAD (dictionary)" corresponding to the user-selected text example "wet, even road" according to the second abstraction rule. Using the token abstraction scores above, the computer, for example, generates a rule abstraction score for the linguistic pattern extraction rule [ADJ] (2)+ROAD (dictionary) equal to 1; generates a rule abstraction score for the linguistic pattern extraction rule [ADJ](1-2)+ROAD (dictionary) equal to 2; generates a rule abstraction score for linguistic pattern extraction rule [ADJ] (0-2)+ROAD (dictionary) equal to 3; and the like.

The third abstraction rule is abstraction by heuristics based on historic usage of different types of abstractions in linguistic pattern extraction rules corresponding to respective users using machine learning. The computer may add the third abstraction rule to the result of the second abstraction rule. For example, the computer may generate and use any linguistic pattern extraction rules and scores based on machine learning regarding the historic usage of different types of abstractions by different users. For example, the computer may generate a linguistic pattern extraction rule of "[NOUN] [NOUN] [NOUN]" that corresponds to [NOUN] (0-3), "[NOUN], [NOUN], and [NOUN]", or the like.

As an illustrative use case scenario, assume a quality assurance engineer of a vehicle tire manufacturer wants to analyze customer issue documents (e.g., complaint reports). The engineer is interested in customer issues related to specific road conditions. As a result, the engineer wants to search the customer issue documents for certain expressions, such as, for example, "uneven road", "rough road", "smooth road", "icy road", "clean pavement", and the like. However, the engineer knows it is very labor intensive and time consuming to search all patterns of road conditions one by one. Thus, the engineer needs to create different "linguistic patterns" corresponding to road conditions. For example, a linguistic pattern of "[adjective] road" matches "uneven road", "rough road", "smooth road", "icy road", but does not match "clean pavement". In other words, the adjective in the linguistic pattern may be replaced with a different adjective. The linguistic pattern classifies a word as a specific entity based on the entities around it.

Each linguistic pattern extraction rule has a level of abstraction. If the linguistic pattern extraction rule is "[adjective] [noun]", then this linguistic pattern extraction rule will generate too many linguistic pattern matches, such as, for example, clean room, good place, and the like, in a document. In this example, the linguistic pattern extraction rule of "[adjective] [noun]" is more "abstract" than the linguistic pattern extraction rule "[adjective] road". If the linguistic pattern extraction rule is "(uneven rough) road", then the linguistic patterns of "uneven road" and "rough road" contained in a document will match this rule, but the linguistic pattern of "icy road" will not match this rule. In this example, the linguistic pattern extraction rule "(uneven rough) road" is more specific than the linguistic pattern extraction rule "[adjective] road".

In natural language processing, this is known as pattern extraction. If the user selects a particular "road condition" linguistic pattern extraction rule, then the computer automatically searches for and extracts same or similar linguistic patterns from documents using that particular rule. In addition, the computer adds some type of mark (e.g., annotation or the like) or highlight (e.g., different color text or background, underline, italics, or the like) to the extracted linguistic pattern for easier reference in the documents by the user. The user can then retrieve the documents containing the annotated or highlighted "road condition" linguistic patterns.

When the computer reads a document, the computer automatically divides the document into tokens using, for example, syntactic rules (i.e., tokenization). For example, in the sentence "I have a pen", the computer may identify the tokens in the sentence as "I", "have", "a", and "pen". As another example, for the sentence "COVID-19 is contagious", the computer may identify the tokens of the sentence as "COVID", "19", "is", and "contagious" or may identify the tokens as "COVID-19", "is", and "contagious".

When a user selects a text example, such as "uneven road", from a document, then the computer generates a plurality of possible linguistic pattern extraction rules, such as, for example, [uneven|rough|icy] road, [adjective] road, [adjective] [noun], and the like, corresponding to the user-selected text example based on an abstraction rule. If the user wants to catch more complex or composite linguistic patterns, such as, for example, "uneven, rough road", "uneven, icy road", and the like, then the computer generates a linguistic pattern extraction rule, such as, for example, "[adjective] [adjective]+road" based on the second abstraction rule. In this example, the computer typically generates a "repeating" token linguistic pattern extraction rule, such as, for example, [adjective]→only one adjective, [adjective]*→zero or more consecutive adjectives, [adjective]+→one or more consecutive adjectives, or the like.

Illustrative embodiments complete linguistic pattern extraction rule generation when the user selects one particular linguistic pattern extraction rule from a list of rules, which illustrative embodiments display in descending order based on respective rule scores. Illustrative embodiments then apply the user-selected linguistic pattern extraction rule to user-selected documents in a particular data domain to automatically extract user-desired linguistic patterns from the user-selected documents and annotate the user-desired linguistic patterns to enable easier user review. Illustrative embodiments also provide a user interface that enables the user to increase or decrease the level of abstraction of that particular linguistic pattern extraction rule.

Thus, illustrative embodiments provide one or more technical solutions that overcome a technical problem with extracting linguistic patterns, which are similar to a user-selected example, from a plurality of documents for data analysis. As a result, these one or more technical solutions provide a technical effect and practical application in the field of data analysis.

With reference now to FIGS. 3A-3D, a flowchart illustrating a process for generating linguistic pattern extraction rules to automatically extract linguistic patterns from documents is shown in accordance with an illustrative embodiment. The process shown in FIGS. 3A-3D may be implemented in a computer, such as, for example, server 104 in FIG. 1 or data processing system 200 in FIG. 2. For example, the process shown in FIGS. 3A-3D may be implemented in rule manager 218 in FIG. 2.

Figure 3A:
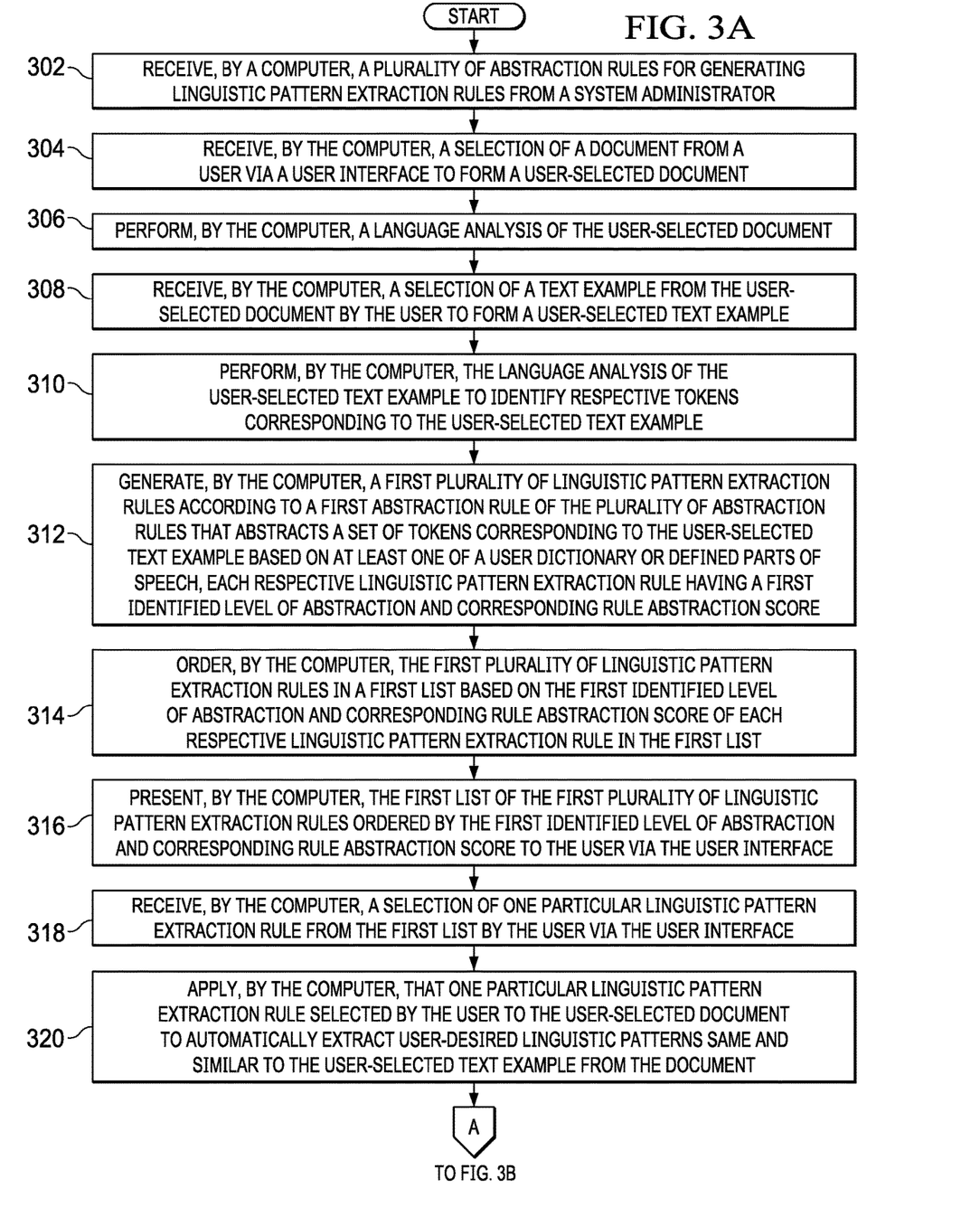
FIGS. 3A-3D are a flowchart illustrating a process for generating linguistic pattern extraction rules to automatically extract linguistic patterns from documents in accordance with an illustrative embodiment.

The process begins when the computer receives a plurality of abstraction rules for generating linguistic pattern extraction rules from a system administrator (step 302). The computer also receives a selection of a document from a user via a user interface to form a user-selected document (step 304).

The computer performs a language analysis of the user-selected document (step 306). The language analysis may include, for example, natural language processing, morphological analysis, syntactical analysis, and the like. In addition, the computer receives a selection of a text example from the user-selected document by the user to form a user-selected text example (step 308). The user-selected text example may be, for example, a sentence, a portion of the sentence, a word, or the like. Further, the computer performs the language analysis of the user-selected text example as well to identify respective tokens corresponding to the user-selected text example (step 310).

Afterward, the computer generates a first plurality of linguistic pattern extraction rules according to a first abstraction rule of the plurality of abstraction rules that abstracts a set of tokens corresponding to the user-selected text example based on at least one of a user dictionary or defined parts of speech (step 312). Each respective linguistic pattern extraction rule in the first plurality of linguistic pattern extraction rules has a first identified level of abstraction and corresponding rule abstraction score. Furthermore, the computer orders the first plurality of linguistic pattern extraction rules in a first list based on the first identified level of abstraction and corresponding rule abstraction score of each respective linguistic pattern extraction rule in the first list (step 314).

Figure 3B:
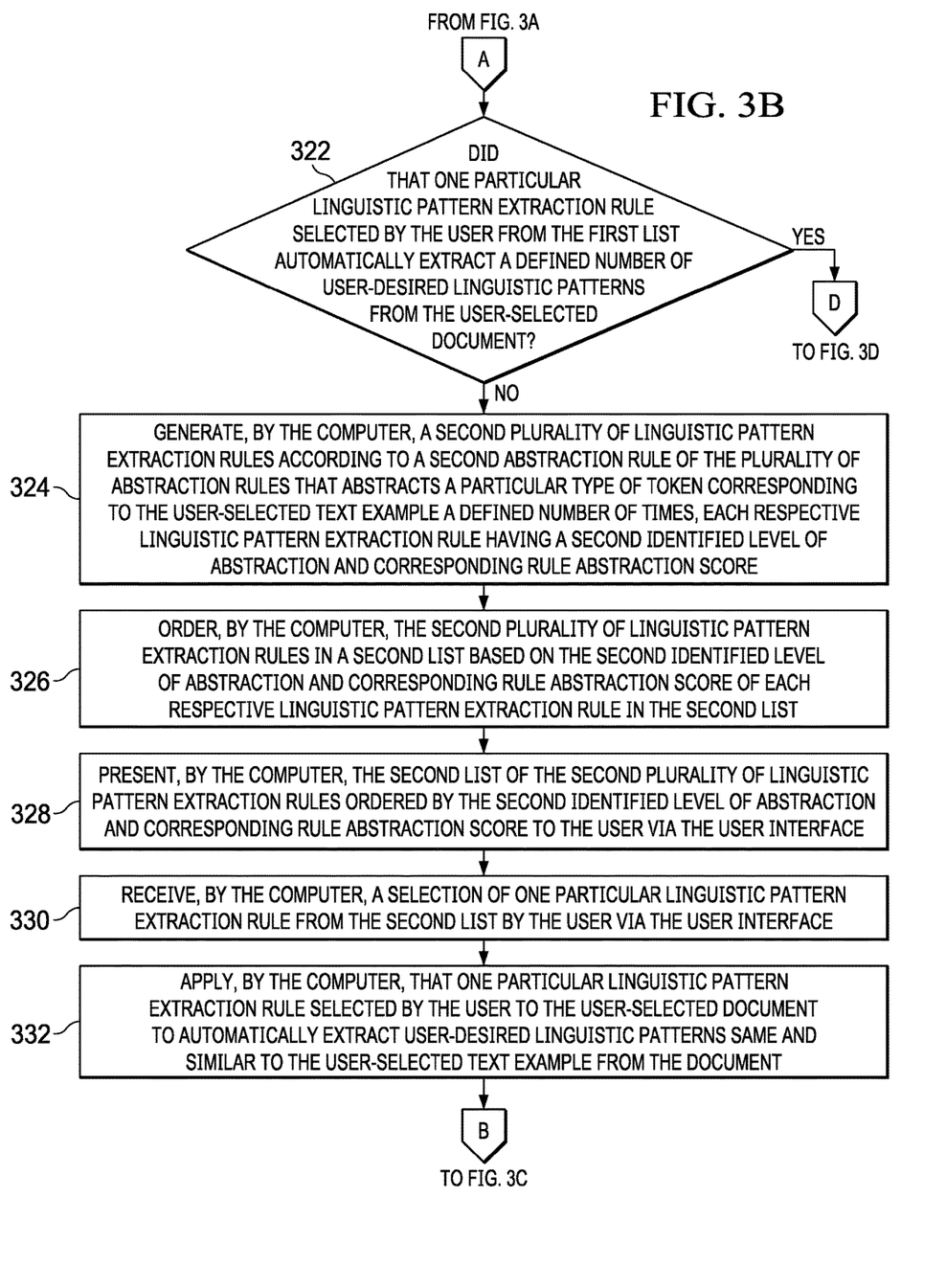

The computer presents the first list of the first plurality of linguistic pattern extraction rules ordered by the first identified level of abstraction and corresponding rule abstraction score to the user via the user interface (step 316). Subsequently, the computer receives a selection of one particular linguistic pattern extraction rule from the first list by the user via the user interface (step 318). The computer applies that one particular linguistic pattern extraction rule selected by the user to the user-selected document to automatically extract user-desired linguistic patterns same and similar to the user-selected text example from the document (step 320).

The computer makes a determination as to whether that one particular linguistic pattern extraction rule selected by the user from the first list automatically extracted a defined number of user-desired linguistic patterns from the user-selected document (step 322). If the computer determines that one particular linguistic pattern extraction rule selected by the user from the first list did automatically extract the defined number of user-desired linguistic patterns from the user-selected document, yes output of step 322, then the process proceeds to step 352. If the computer determines that one particular linguistic pattern extraction rule selected by the user from the first list did not automatically extract the defined number of user-desired linguistic patterns from the user-selected document, no output of step 322, then the computer generates a second plurality of linguistic pattern extraction rules according to a second abstraction rule of the plurality of abstraction rules that abstracts a particular type of token corresponding to the user-selected text example a defined number of times (step 324). Each respective linguistic pattern extraction rule in the second plurality of linguistic pattern extraction rules has a second identified level of abstraction and corresponding rule abstraction score.

The computer orders the second plurality of linguistic pattern extraction rules in a second list based on the second identified level of abstraction and corresponding rule abstraction score of each respective linguistic pattern extraction rule in the second list (step 326). The computer presents the second list of the second plurality of linguistic pattern extraction rules ordered by the second identified level of abstraction and corresponding rule abstraction score to the user via the user interface (step 328). The computer receives a selection of one particular linguistic pattern extraction rule from the second list by the user via the user interface (step 330).

Figure 3C:
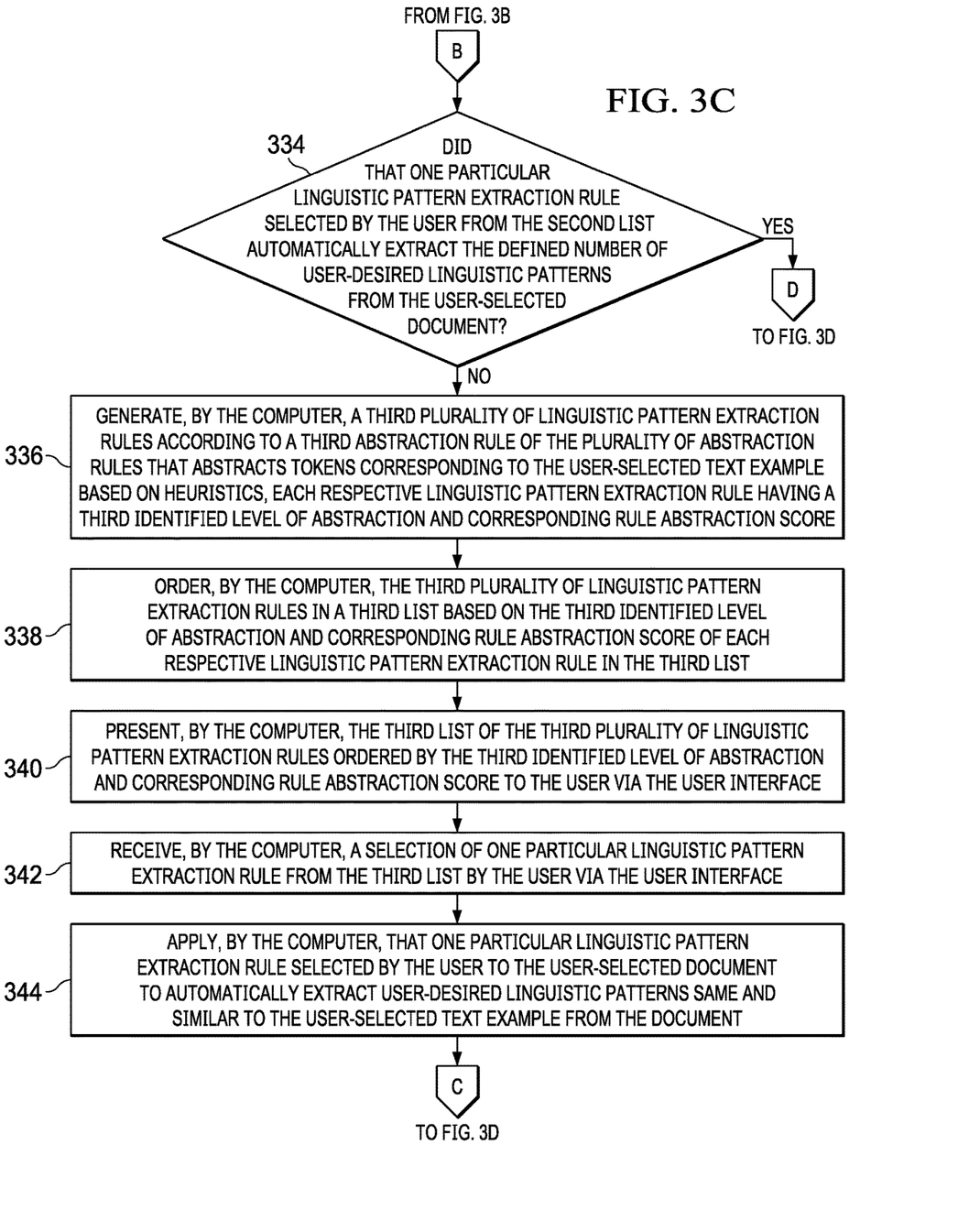

The computer applies that one particular linguistic pattern extraction rule selected by the user to the user-selected document to automatically extract the user-desired linguistic patterns same and similar to the user-selected text example from the document (step 332). The computer makes a determination as to whether that one particular linguistic pattern extraction rule selected by the user from the second list automatically extracted the defined number of user-desired linguistic patterns from the user-selected document (step 334). If the computer determines that one particular linguistic pattern extraction rule selected by the user from the second list did automatically extract the defined number of user-desired linguistic patterns from the user-selected document, yes output of step 334, then the process proceeds to step 352. If the computer determines that one particular linguistic pattern extraction rule selected by the user from the second list did not automatically extract the defined number of user-desired linguistic patterns from the user-selected document, no output of step 334, then the computer generates a third plurality of linguistic pattern extraction rules according to a third abstraction rule of the plurality of abstraction rules that abstracts tokens corresponding to the user-selected text example based on heuristics (step 336). Each respective linguistic pattern extraction rule in the third plurality of linguistic pattern extraction rules has a third identified level of abstraction and corresponding rule abstraction score.

The computer orders the third plurality of linguistic pattern extraction rules in a third list based on the third identified level of abstraction and corresponding rule abstraction score of each respective linguistic pattern extraction rule in the third list (step 338). The computer presents the third list of the third plurality of linguistic pattern extraction rules ordered by the third identified level of abstraction and corresponding rule abstraction score to the user via the user interface (step 340). The computer receives a selection of one particular linguistic pattern extraction rule from the third list by the user via the user interface (step 342).

Figure 3D:
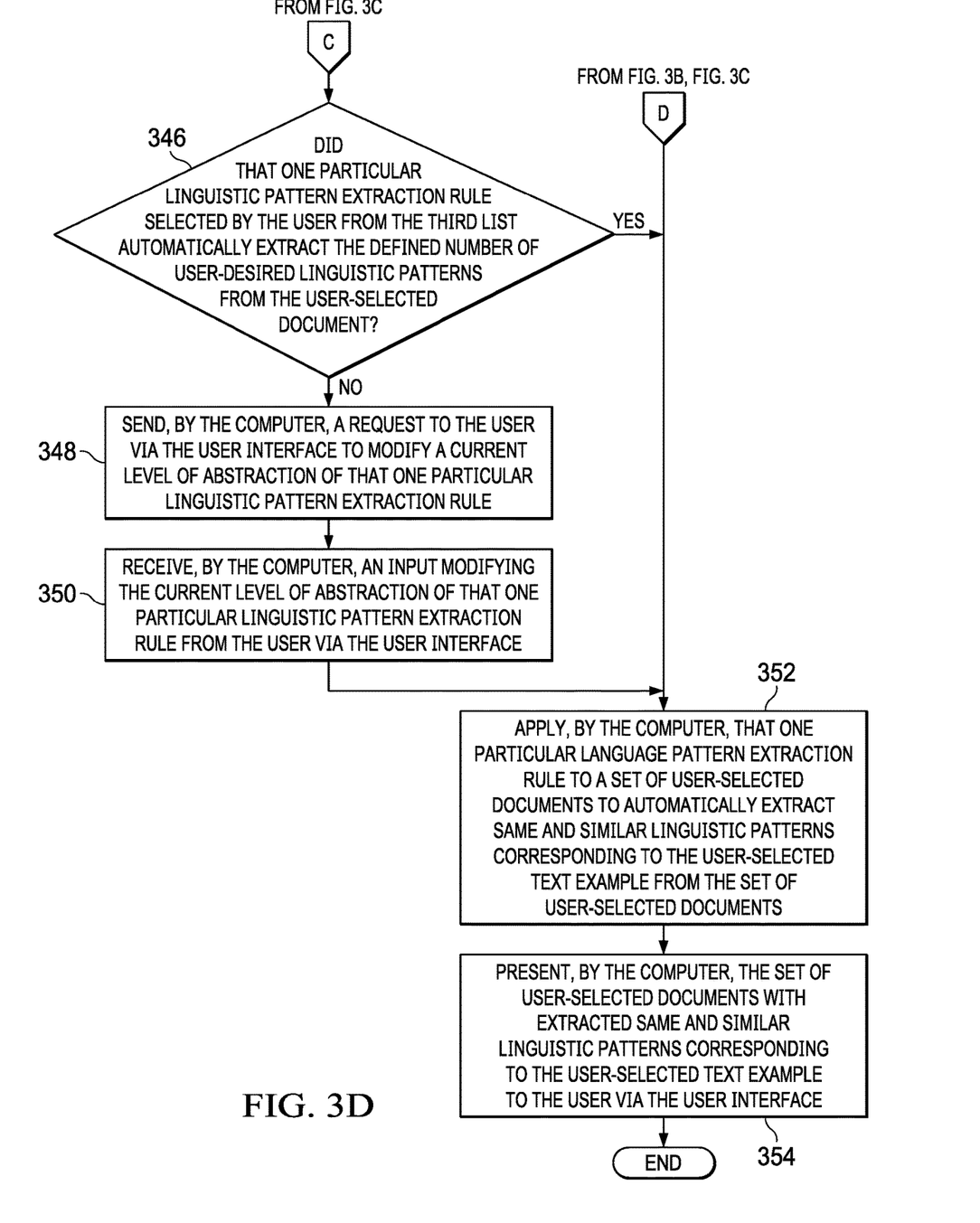

The computer applies that one particular linguistic pattern extraction rule selected by the user to the user-selected document to automatically extract the user-desired linguistic patterns same and similar to the user-selected text example from the document (step 344). The computer makes a determination as to whether that one particular linguistic pattern extraction rule selected by the user from the third list automatically extracted the defined number of user-desired linguistic patterns from the user-selected document (step 346). If the computer determines that one particular linguistic pattern extraction rule selected by the user from the third list did automatically extract the defined number of user-desired linguistic patterns from the user-selected document, yes output of step 346, then the process proceeds to step 352. If the computer determines that one particular linguistic pattern extraction rule selected by the user from the third list did not automatically extract the defined number of user-desired linguistic patterns from the user-selected document, no output of step 346, then the computer sends a request to the user via the user interface to modify a current level of abstraction of that one particular linguistic pattern extraction rule using the user interface (step 348).

Subsequently, the computer receives an input modifying the current level of abstraction of that one particular linguistic pattern extraction rule from the user via the user interface (step 350). The computer applies that one particular language pattern extraction rule to a set of user-selected documents to automatically extract same and similar linguistic patterns corresponding to the user-selected text example from the set of user-selected documents (step 352). The computer presents the set of user-selected documents with extracted same and similar linguistic patterns corresponding to the user-selected text example to the user via the user interface (step 354). Thereafter, the process terminates.

Thus, illustrative embodiments of the present invention provide a computer-implemented method, computer system, and computer program product for generating linguistic pattern extraction rules corresponding to a user-selected text example from a document according to an abstraction rule to automatically extract linguistic patterns from a set of user-selected documents based on linguistic context of the user-selected text example using natural language processing. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating rules to automatically extract linguistic patterns from documents, the computer-implemented method comprising:
   generating, by a computer, a first plurality of linguistic pattern extraction rules corresponding to a user-selected text example from a document according to a first abstraction rule of a plurality of abstraction rules, each respective linguistic pattern extraction rule of the first plurality of linguistic pattern extraction rules having a first identified level of abstraction;
   presenting, by the computer, the first plurality of linguistic pattern extraction rules ordered by the first identified level of abstraction in a first list to a user via a user interface;
   receiving, by the computer, a selection of one particular linguistic pattern extraction rule from the first list by the user via the user interface; and
   applying, by the computer, that one particular linguistic pattern extraction rule selected by the user to the document to automatically extract user-desired linguistic patterns similar to the user-selected text example from the document.

2. The computer-implemented method of claim 1 further comprising:
   determining, by the computer, whether that one particular linguistic pattern extraction rule selected by the user from the first list automatically extracted a defined number of user-desired linguistic patterns from the document;
   responsive to the computer determining that the one particular linguistic pattern extraction rule selected by the user from the first list did automatically extract the defined number of user-desired linguistic patterns from the document, applying, by the computer, that one particular language pattern extraction rule to a set of user-selected documents to automatically extract similar linguistic patterns corresponding to the user-selected text example from the set of user-selected documents; and
   presenting, by the computer, the set of user-selected documents with extracted similar linguistic patterns corresponding to the user-selected text example to the user via the user interface.

3. The computer-implemented method of claim 2 further comprising:
   responsive to the computer determining that the one particular linguistic pattern extraction rule selected by the user from the first list did not automatically extract the defined number of user-desired linguistic patterns from the user-selected document, generating, by the computer, a second plurality of linguistic pattern extraction rules corresponding to the user-selected text example from the document according to a second abstraction rule of the plurality of abstraction rules, each respective linguistic pattern extraction rule of the second plurality of linguistic pattern extraction rules having a second identified level of abstraction;

presenting, by the computer, the second plurality of linguistic pattern extraction rules ordered by the second identified level of abstraction in a second list to the user via the user interface;

receiving, by the computer, a selection of one particular linguistic pattern extraction rule from the second list by the user via the user interface; and applying, by the computer, that one particular linguistic pattern extraction rule selected by the user to the user-selected document to automatically extract the user-desired linguistic patterns similar to the user-selected text example from the document.

4. The computer-implemented method of claim 3 further comprising:

determining, by the computer, whether that one particular linguistic pattern extraction rule selected by the user from the second list automatically extracted the defined number of user-desired linguistic patterns from the user-selected document;

responsive to the computer determining that the one particular linguistic pattern extraction rule selected by the user from the second list did not automatically extract the defined number of user-desired linguistic patterns from the user-selected document, generating, by the computer, a third plurality of linguistic pattern extraction rules according to a third abstraction rule of the plurality of abstraction rules, each respective linguistic pattern extraction rule in the third plurality of linguistic pattern extraction rules has a third identified level of abstraction and corresponding rule abstraction score;

presenting, by the computer, the third plurality of linguistic pattern extraction rules ordered by the third identified level of abstraction in a third list to the user via the user interface;

receiving, by the computer, a selection of one particular linguistic pattern extraction rule from the third list by the user via the user interface; and applying, by the computer, that one particular linguistic pattern extraction rule selected by the user to the user-selected document to automatically extract the user-desired linguistic patterns same and similar to the user-selected text example from the document.

5. The computer-implemented method of claim 4 further comprising:

determining, by the computer, whether that one particular linguistic pattern extraction rule selected by the user from the third list automatically extracted the defined number of user-desired linguistic patterns from the user-selected document;

responsive to the computer determining that the one particular linguistic pattern extraction rule selected by the user from the third list did not automatically extract the defined number of user-desired linguistic patterns from the user-selected document, sending, by the computer, a request to the user via the user interface to modify a current level of abstraction of that one particular linguistic pattern extraction rule using the user interface; and receiving, by the computer, an input modifying the current level of abstraction of that one particular linguistic pattern extraction rule from the user via the user interface.

6. The computer-implemented method of claim 5, wherein the first abstraction rule abstracts a set of tokens corresponding to the user-selected text example based on at least one of a user dictionary or defined parts of speech, and wherein the second abstraction rule abstracts a particular type of token corresponding to the user-selected text example a defined number of times, and wherein the third abstraction rule abstracts tokens corresponding to the user-selected text example based on heuristics.

7. The computer-implemented method of claim 5, wherein each respective linguistic pattern extraction rule has a corresponding rule abstraction score that is based on a sum of token abstraction scores of a set of tokens in a given linguistic pattern extraction rule for ordering linguistic pattern extraction rules in a given list.

8. The computer-implemented method of claim 1 further comprising:

receiving, by the computer, the plurality of abstraction rules for generating linguistic pattern extraction rules from a system administrator;

receiving, by the computer, a selection of the document from the user via the user interface to form a user-selected document;

performing, by the computer, a language analysis of the user-selected document, wherein the language analysis includes at least one of natural language processing, morphological analysis, and syntactical analysis;

receiving, by the computer, a selection of a text example from the user-selected document by the user to form the user-selected text example; and performing, by the computer, the language analysis of the user-selected text example to identify respective tokens corresponding to the user-selected text example.

9. The computer-implemented method of claim 1, wherein the computer annotates or highlights linguistic patterns extracted from documents.

10. A computer system for generating rules to automatically extract linguistic patterns from documents, the computer system comprising:

a bus system;

a storage device connected to the bus system, wherein the storage device stores program instructions; and a processor connected to the bus system, wherein the processor executes the program instructions to:

generate a first plurality of linguistic pattern extraction rules corresponding to a user-selected text example from a document according to a first abstraction rule of a plurality of abstraction rules, each respective linguistic pattern extraction rule of the first plurality of linguistic pattern extraction rules having a first identified level of abstraction;

present the first plurality of linguistic pattern extraction rules ordered by the first identified level of abstraction in a first list to a user via a user interface;

receive a selection of one particular linguistic pattern extraction rule from the first list by the user via the user interface; and apply that one particular linguistic pattern extraction rule selected by the user to the document to automatically extract user-desired linguistic patterns similar to the user-selected text example from the document.

11. The computer system of claim 10, wherein the processor further executes the program instructions to:
   determine whether that one particular linguistic pattern extraction rule selected by the user from the first list automatically extracted a defined number of user-desired linguistic patterns from the document;
   apply that one particular language pattern extraction rule to a set of user-selected documents to automatically extract similar linguistic patterns corresponding to the user-selected text example from the set of user-selected documents in response to determining that the one particular linguistic pattern extraction rule selected by the user from the first list did automatically extract the defined number of user-desired linguistic patterns from the document; and
   present the set of user-selected documents with extracted similar linguistic patterns corresponding to the user-selected text example to the user via the user interface.

12. The computer system of claim 11, wherein the processor further executes the program instructions to:
   generate a second plurality of linguistic pattern extraction rules corresponding to the user-selected text example from the document according to a second abstraction rule of the plurality of abstraction rules in response to determining that the one particular linguistic pattern extraction rule selected by the user from the first list did not automatically extract the defined number of user-desired linguistic patterns from the user-selected document, each respective linguistic pattern extraction rule of the second plurality of linguistic pattern extraction rules having a second identified level of abstraction;
   present the second plurality of linguistic pattern extraction rules ordered by the second identified level of abstraction in a second list to the user via the user interface;
   receive a selection of one particular linguistic pattern extraction rule from the second list by the user via the user interface; and
   apply that one particular linguistic pattern extraction rule selected by the user to the user-selected document to automatically extract the user-desired linguistic patterns similar to the user-selected text example from the document.

13. The computer system of claim 12, wherein the processor further executes the program instructions to:
   determine whether that one particular linguistic pattern extraction rule selected by the user from the second list automatically extracted the defined number of user-desired linguistic patterns from the user-selected document;
   generate a third plurality of linguistic pattern extraction rules according to a third abstraction rule of the plurality of abstraction rules in response to determining that the one particular linguistic pattern extraction rule selected by the user from the second list did not automatically extract the defined number of user-desired linguistic patterns from the user-selected document, each respective linguistic pattern extraction rule in the third plurality of linguistic pattern extraction rules has a third identified level of abstraction and corresponding rule abstraction score;
   present the third plurality of linguistic pattern extraction rules ordered by the third identified level of abstraction in a third list to the user via the user interface;
   receive a selection of one particular linguistic pattern extraction rule from the third list by the user via the user interface; and
   apply that one particular linguistic pattern extraction rule selected by the user to the user-selected document to automatically extract the user-desired linguistic patterns same and similar to the user-selected text example from the document.

14. The computer system of claim 13, wherein the processor further executes the program instructions to:
   determine whether that one particular linguistic pattern extraction rule selected by the user from the third list automatically extracted the defined number of user-desired linguistic patterns from the user-selected document;
   send a request to the user via the user interface to modify a current level of abstraction of that one particular linguistic pattern extraction rule using the user interface in response to determining that the one particular linguistic pattern extraction rule selected by the user from the third list did not automatically extract the defined number of user-desired linguistic patterns from the user-selected document; and
   receive an input modifying the current level of abstraction of that one particular linguistic pattern extraction rule from the user via the user interface.

15. A computer program product for generating rules to automatically extract linguistic patterns from documents, the computer program product comprising a computer-readable storage medium having program instructions embodied therewith, the program instructions executable by a computer to cause the computer to perform a method of:
   generating, by the computer, a first plurality of linguistic pattern extraction rules corresponding to a user-selected text example from a document according to a first abstraction rule of a plurality of abstraction rules, each respective linguistic pattern extraction rule of the first plurality of linguistic pattern extraction rules having a first identified level of abstraction;
   presenting, by the computer, the first plurality of linguistic pattern extraction rules ordered by the first identified level of abstraction in a first list to a user via a user interface;
   receiving, by the computer, a selection of one particular linguistic pattern extraction rule from the first list by the user via the user interface; and
   applying, by the computer, that one particular linguistic pattern extraction rule selected by the user to the document to automatically extract user-desired linguistic patterns similar to the user-selected text example from the document.

16. The computer program product of claim 15 further comprising:
   determining, by the computer, whether that one particular linguistic pattern extraction rule selected by the user from the first list automatically extracted a defined number of user-desired linguistic patterns from the document;
   responsive to the computer determining that the one particular linguistic pattern extraction rule selected by the user from the first list did automatically extract the defined number of user-desired linguistic patterns from the document, applying, by the computer, that one particular language pattern extraction rule to a set of user-selected documents to automatically extract similar linguistic patterns corresponding to the user-selected text example from the set of user-selected documents; and presenting, by the computer, the set of user-selected documents with extracted similar linguistic patterns corresponding to the user-selected text example to the user via the user interface.

17. The computer program product of claim 16 further comprising:

responsive to the computer determining that the one particular linguistic pattern extraction rule selected by the user from the first list did not automatically extract the defined number of user-desired linguistic patterns from the user-selected document, generating, by the computer, a second plurality of linguistic pattern extraction rules corresponding to the user-selected text example from the document according to a second abstraction rule of the plurality of abstraction rules, each respective linguistic pattern extraction rule of the second plurality of linguistic pattern extraction rules having a second identified level of abstraction;

presenting, by the computer, the second plurality of linguistic pattern extraction rules ordered by the second identified level of abstraction in a second list to the user via the user interface;

receiving, by the computer, a selection of one particular linguistic pattern extraction rule from the second list by the user via the user interface; and applying, by the computer, that one particular linguistic pattern extraction rule selected by the user to the user-selected document to automatically extract the user-desired linguistic patterns similar to the user-selected text example from the document.

18. The computer program product of claim 17 further comprising:

determining, by the computer, whether that one particular linguistic pattern extraction rule selected by the user from the second list automatically extracted the defined number of user-desired linguistic patterns from the user-selected document;

responsive to the computer determining that the one particular linguistic pattern extraction rule selected by the user from the second list did not automatically extract the defined number of user-desired linguistic patterns from the user-selected document, generating, by the computer, a third plurality of linguistic pattern extraction rules according to a third abstraction rule of the plurality of abstraction rules, each respective linguistic pattern extraction rule in the third plurality of linguistic pattern extraction rules has a third identified level of abstraction and corresponding rule abstraction score;

presenting, by the computer, the third plurality of linguistic pattern extraction rules ordered by the third identified level of abstraction in a third list to the user via the user interface;

receiving, by the computer, a selection of one particular linguistic pattern extraction rule from the third list by the user via the user interface; and applying, by the computer, that one particular linguistic pattern extraction rule selected by the user to the user-selected document to automatically extract the user-desired linguistic patterns same and similar to the user-selected text example from the document.

19. The computer program product of claim 18 further comprising:

determining, by the computer, whether that one particular linguistic pattern extraction rule selected by the user from the third list automatically extracted the defined number of user-desired linguistic patterns from the user-selected document;

responsive to the computer determining that the one particular linguistic pattern extraction rule selected by the user from the third list did not automatically extract the defined number of user-desired linguistic patterns from the user-selected document, sending, by the computer, a request to the user via the user interface to modify a current level of abstraction of that one particular linguistic pattern extraction rule using the user interface; and receiving, by the computer, an input modifying the current level of abstraction of that one particular linguistic pattern extraction rule from the user via the user interface.

20. The computer program product of claim 19, wherein the first abstraction rule abstracts a set of tokens corresponding to the user-selected text example based on at least one of a user dictionary or defined parts of speech, and wherein the second abstraction rule abstracts a particular type of token corresponding to the user-selected text example a defined number of times, and wherein the third abstraction rule abstracts tokens corresponding to the user-selected text example based on heuristics.

\* \* \* \* \*